United States Patent [19]
Sigmon

[11] Patent Number: 5,431,311
[45] Date of Patent: Jul. 11, 1995

[54] ROTARY AIRLOCK VALVE USING A SINGLE SEAT

[76] Inventor: James W. Sigmon, 2415 Knollwood Rd., Charlotte, N.C. 28211

[21] Appl. No.: 145,887
[22] Filed: Oct. 29, 1993
[51] Int. Cl.$^6$ ............................................. G01F 11/00
[52] U.S. Cl. .................................................. 222/368
[58] Field of Search ............... 222/363, 368, 444, 452; 251/309, 314

[56] References Cited

U.S. PATENT DOCUMENTS

| | | | |
|---|---|---|---|
| 2,907,499 | 10/1959 | Agronin | 222/368 X |
| 3,139,996 | 7/1964 | Welty | 222/368 X |
| 3,370,335 | 2/1968 | Freed | 251/309 X |
| 3,750,902 | 8/1973 | Starrett | 222/368 |
| 4,316,559 | 2/1982 | McLemore | 222/368 X |
| 4,684,040 | 8/1987 | Jonovic et al. | 222/368 X |
| 5,029,517 | 7/1991 | Sigmon | 222/444 X |

Primary Examiner—Kevin P. Shaver
Attorney, Agent, or Firm—Ralph H. Dougherty

[57] ABSTRACT

A vaneless rotor airlock valve using a single seat. In the preferred embodiment a hollow rotor is supported by two bearings to rotate within a first bore of the valve housing, which includes intersecting transverse bores. The rotor includes an opening which extends a selected distance along the axis of the rotor and a distance of less than 90 degrees in a plane perpendicular to the axis. The ends of the second bore terminate at the input port and the output port of the valve. Sealing contact is maintained between the outer surface of the rotor and a non-metallic seat member to maintain pressure isolation between the input port and the output port as the rotor is rotated to alternately position the rotor in a fill and a discharge position. All portions of the interior of the valve are free draining under the force of gravity.

14 Claims, 19 Drawing Sheets

ROTARY AIRLOCK VALVE USING A SINGLE SEAT

DESCRIPTION OF PRIOR ART

Vaneless Rotor Airlock Valves are well known in the prior art. For example Vaneless Rotor Airlock Valves are commercially available from Sigco Valve Company, Charlotte, N.C. These valves function for their intended purpose. However, these valves typically include entrapment zones between the exterior of the rotor and the interior of the housing, in which portions of the material being transferred through the valve may accumulate. (An entrapment zone is defined as a space in which material being transferred through the valve may become entrapped such that it is difficult to remove without disassembling the valve.) Material accumulating in these zones cannot be easily removed. This feature is undesirable in selected applications, such as some food handling applications.

Furthermore, these prior art valves utilized separate seats on the input and the output ports. This feature added significantly to the cost of these valves.

DESCRIPTION OF THE INVENTION

The preferred embodiment of the invention comprises a vaneless rotor airlock valve without entrapment zones between the interior of the housing and the exterior of the rotor. A housing including intersecting transverse bores supports a rotor, which includes a cavity, in the first bore and concentric thereto. The ends of the second bore defining the input port and the output port of the valve. Pressure sealing is provided between the input port and the output port by a sealing structure (including a seat and a compression seal) positioned between the outer surface of the rotor and the interior surface of the first bore. The preferred embodiment of the sealing structure includes a seat, formed of a flexible material in the shape of a cylinder with a gap parallel to its axis.

In addition to eliminating the entrapment zones associated with prior art Vaneless Rotor Airlock Valves, the valve that is the subject matter of this invention utilizes one seat (described above) for both the input port and the output port. This feature significantly reduces the manufacturing cost and improves the performance by eliminating the entrapment zones associated with prior art rotary airlock valves.

DESCRIPTION OF THE INVENTION

Figure 1:
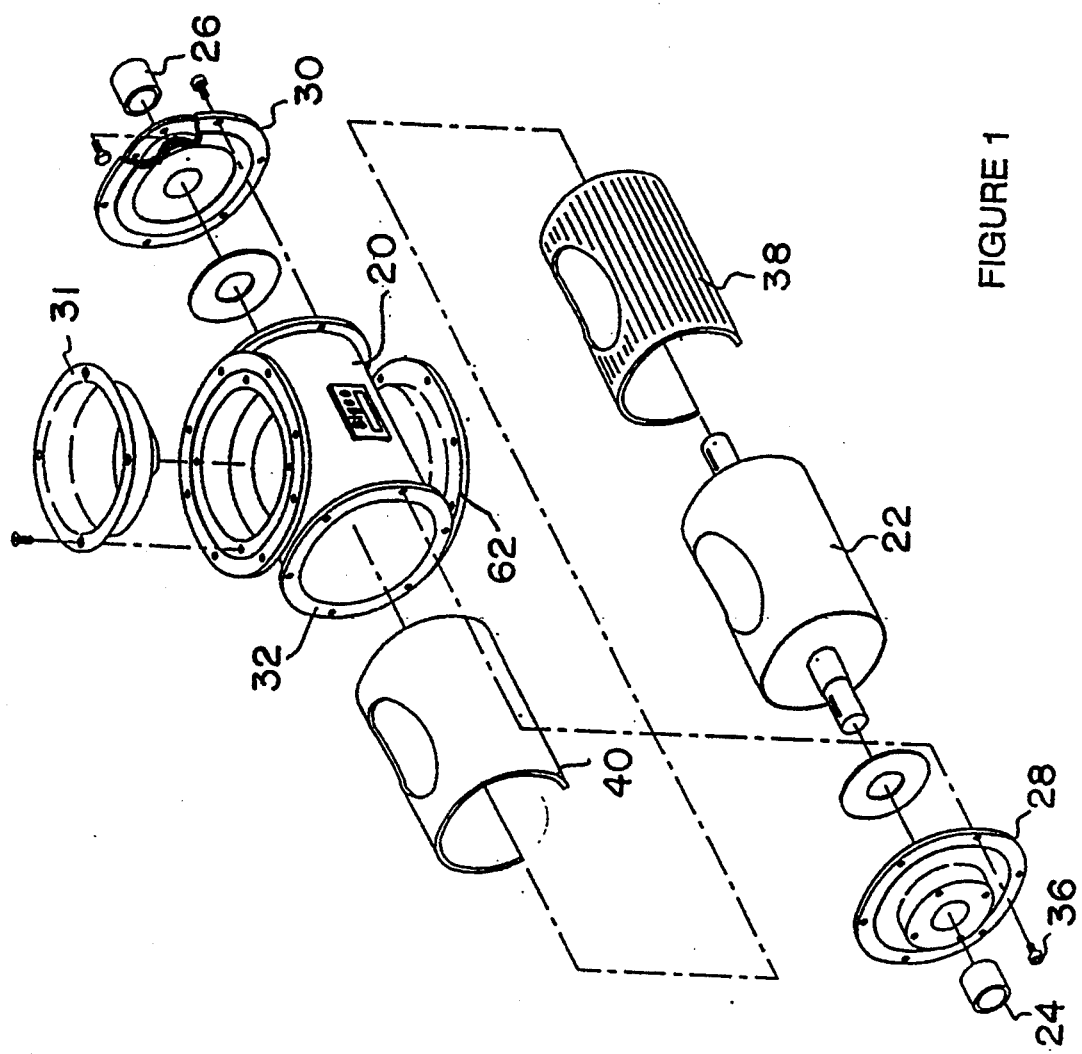
FIG. 1 is an exploded view of the preferred embodiment of the vaneless rotor airlock valve, comprising the preferred embodiment of the invention.

The preferred embodiment of the invention is illustrated in exploded view in FIG. 1. A housing 20 provides means for mounting all components of the vaneless rotor airlock valve in the proper relationship to each other.

Specifically, the rotor 22 is supported in a first bore, of a housing 20 having transverse bores, by first and second bearings, 24 and 26, permitting the rotor 22 to be rotated about its axis by drive means, not shown.

Means for supporting the bearings, 24 and 26, is provided by two end plates, 28 and 30. Identical flanges, typically illustrated at reference number 32, mate with the end plates, 28 and 30. The end plates, 28 and 30, are secured to the housing 20 with fasteners, typically illustrated at reference number 36.

A seat 38 is mounted around the rotor 22 such that the inner surface of the seat 38 is in a sealing relationship to the outer surface of the rotor 22. External pressure is applied to the outer surface of the seat 38 by a resilient compression seal 40, typically made of silicone foam. During normal use the ends of the seat 38 are held in a spaced apart relationship to form a gap, as illustrated in FIG. 1.

Figure 4:
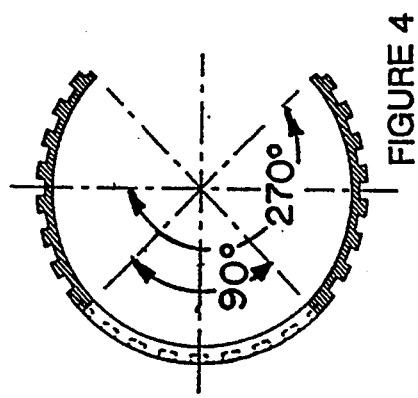
FIG. 4 is a cross section view of the seat along section line B'—B' of FIG. 2.
Figure 2:
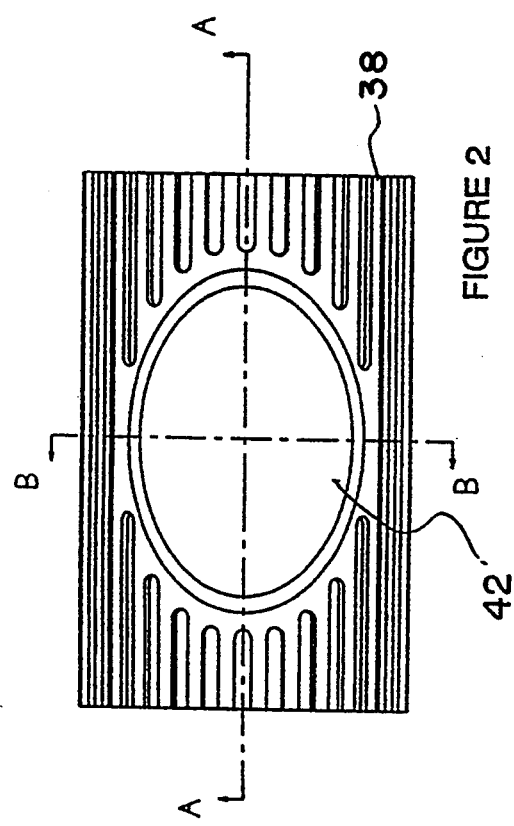
FIG. 2 is a top view of the seat used by the preferred embodiment of the invention.
Figure 3:
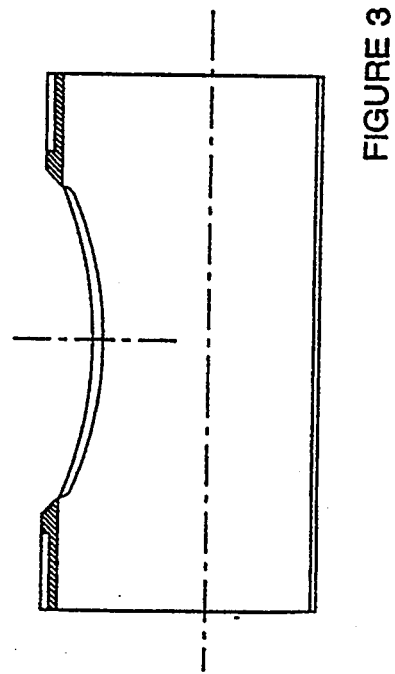
FIG. 3 is a cross section view of the seat along section line A'—A' of FIG. 2.
Figure 4B:
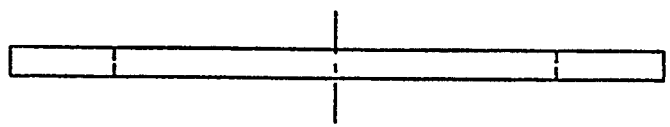
FIG. 4B is a side view of FIG. 4A.
Figure 4A:
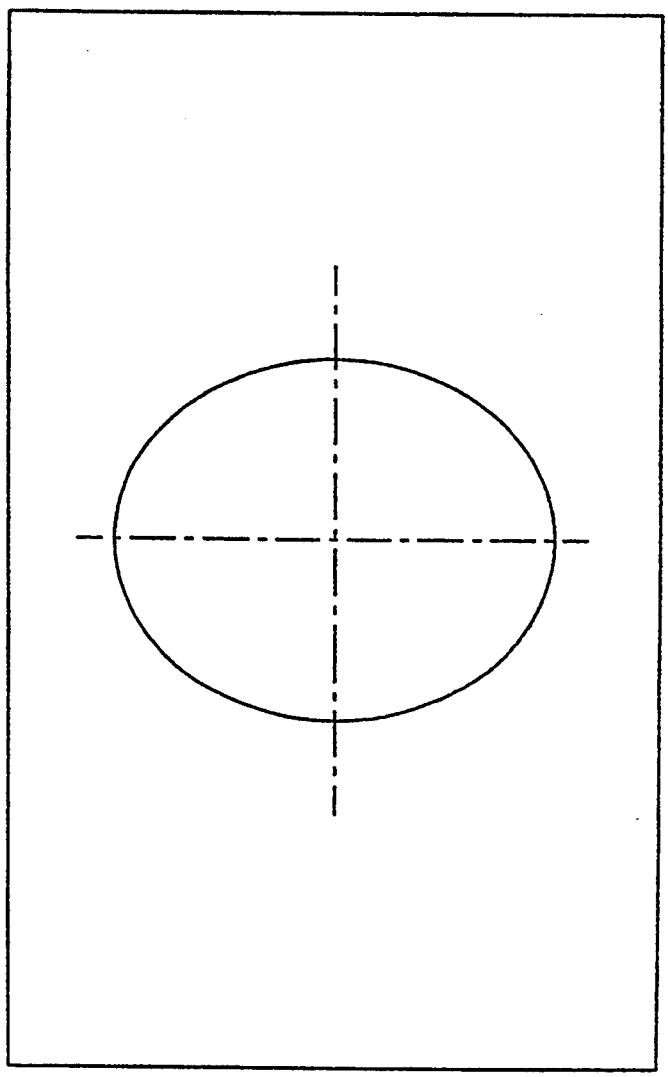
FIG. 4A is a plan view of the compression seal.

The preferred embodiment of the seat 38 is respectively illustrated in top, cross section along its axis, and in cross section parallel to its axis, in FIGS. 2, 3 and 4. As illustrated in FIG. 4, the seat 38 is semicircular in cross section and extends around the rotor 22 a radial distance in the range of 270 degrees. That is to say, the gap is in the range of ninety degrees wide.

During normal operation, material being transferred through the valve is discharged through the gap between the ends of the seat 38. An elliptical opening 42 having a radial width of 90 degrees is equally positioned between the ends of the seat 38. Serrations are spaced along the exterior surface of the seat 38.

In the preferred embodiment, the seat is made of a plastic material, such as UHMW polyethylene. The various features of the seat 38 and those features common to an alternate embodiment of the seat are subsequently discussed in more detail.

Figure 5:
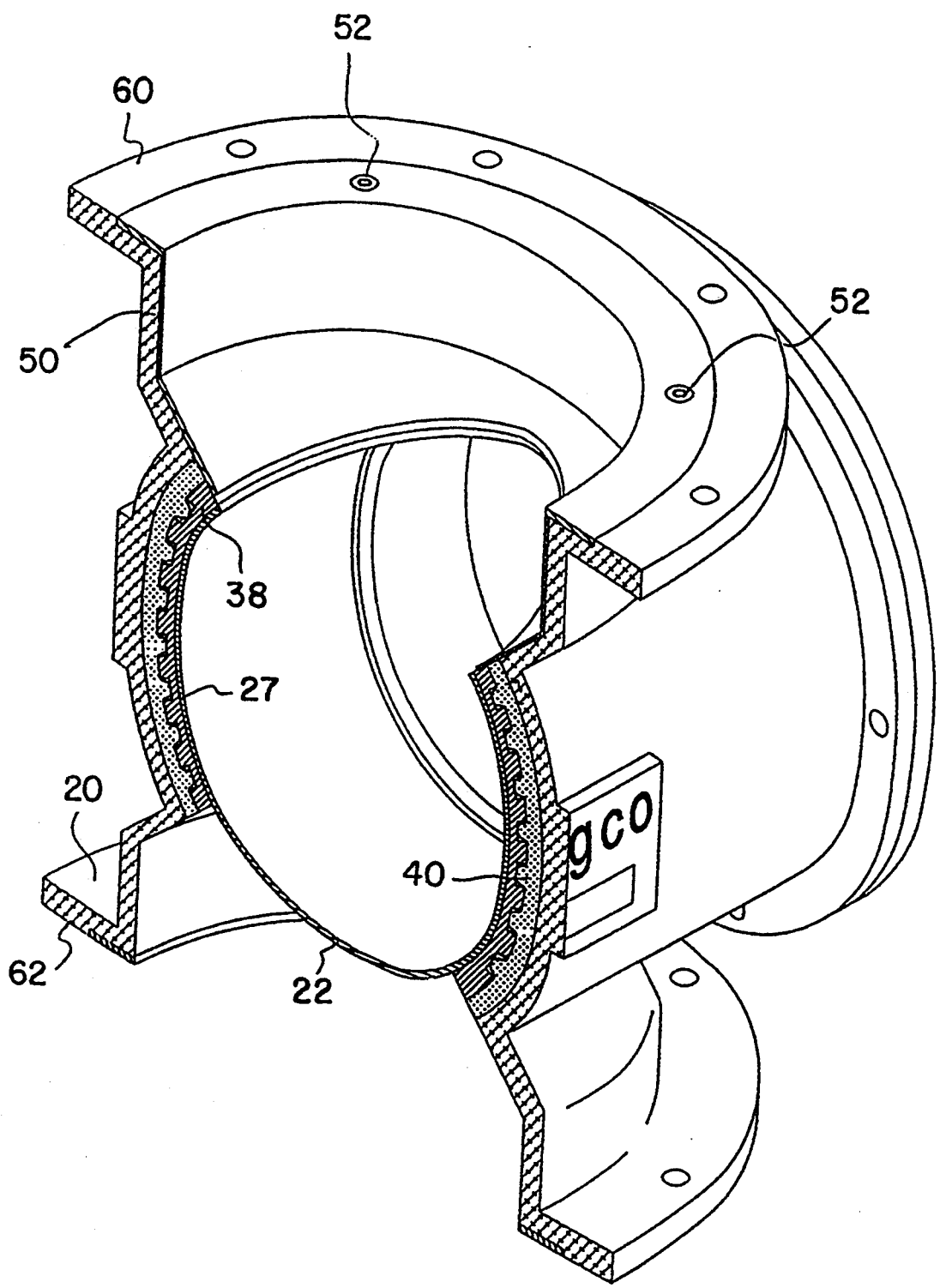
FIG. 5 is a cross section view of the preferred embodiment of the invention in a plane perpendicular to the axis of rotation of the rotor and coincident with the axis of the input port and the output port.

Operation of the vaneless rotor airlock valve can best be understood with reference to FIG. 5. In this drawing the assembled valve is illustrated in cross section view. From this drawing it can be seen that the seat 38 and the compression seal 40 are held in a fixed radial relationship with the other parts of the vaneless rotor airlock valve by a seat retainer 50 that extends downward into the opening in the seat 38 and the compression seal 40. Means holding the seat retainer 50 in a fixed relationship to the housing 20 of the valve is provided by suitable fastening means, such as screws 52.

Material to be transferred enters the vaneless rotor airlock valve through the input port which terminates in the input flange 60 and is collected in the cavity of the rotor 22. Drive means rotates the rotor 22 such that the opening in the rotor 22 is downward. In this position the material collected in the cavity of the rotor 22 is discharged by gravity through the output port terminating in output flange 62.

Figure 6:
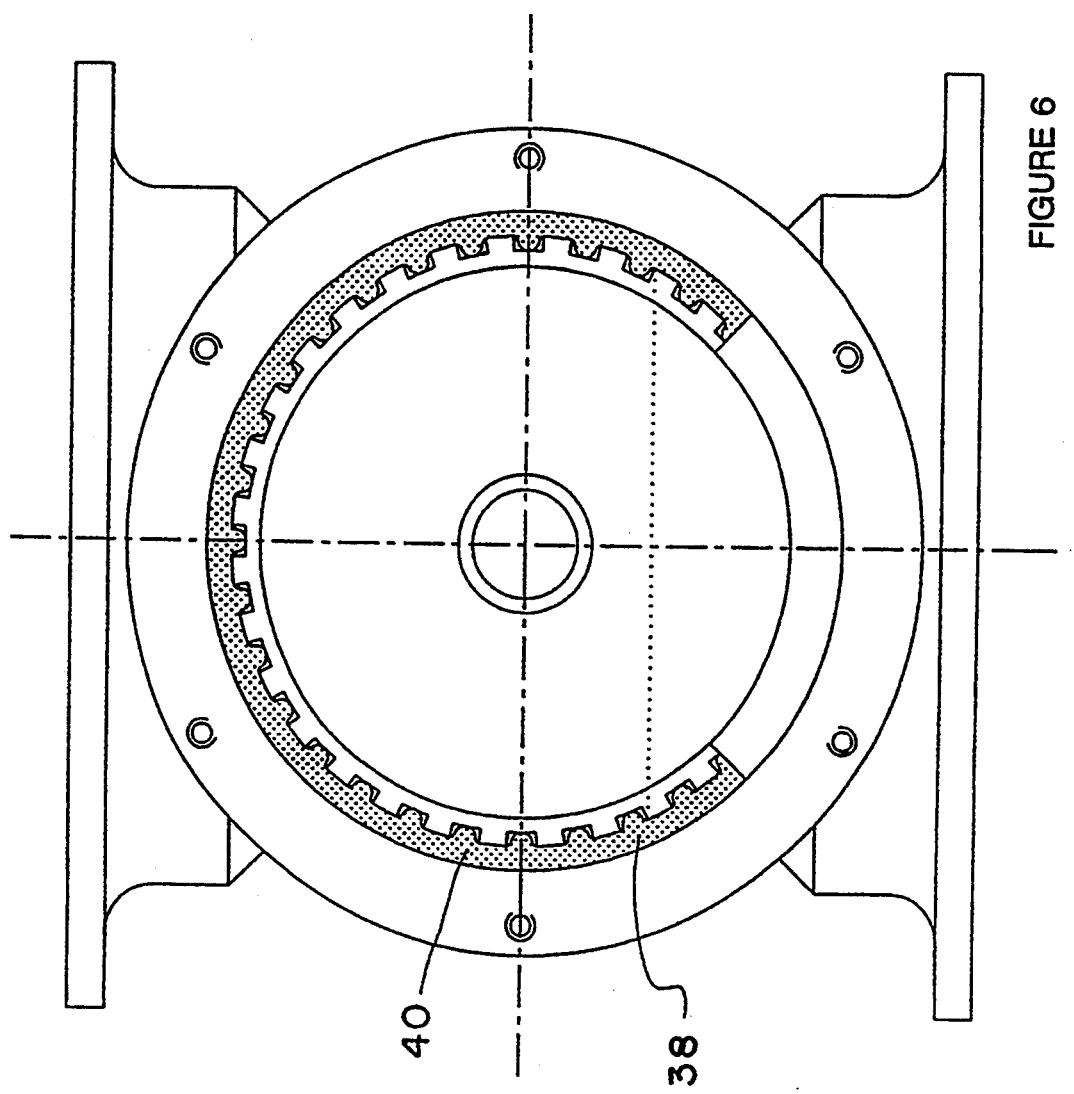
FIG. 6 is an end view of the preferred embodiment of the invention with the end plate removed.
Figure 7:
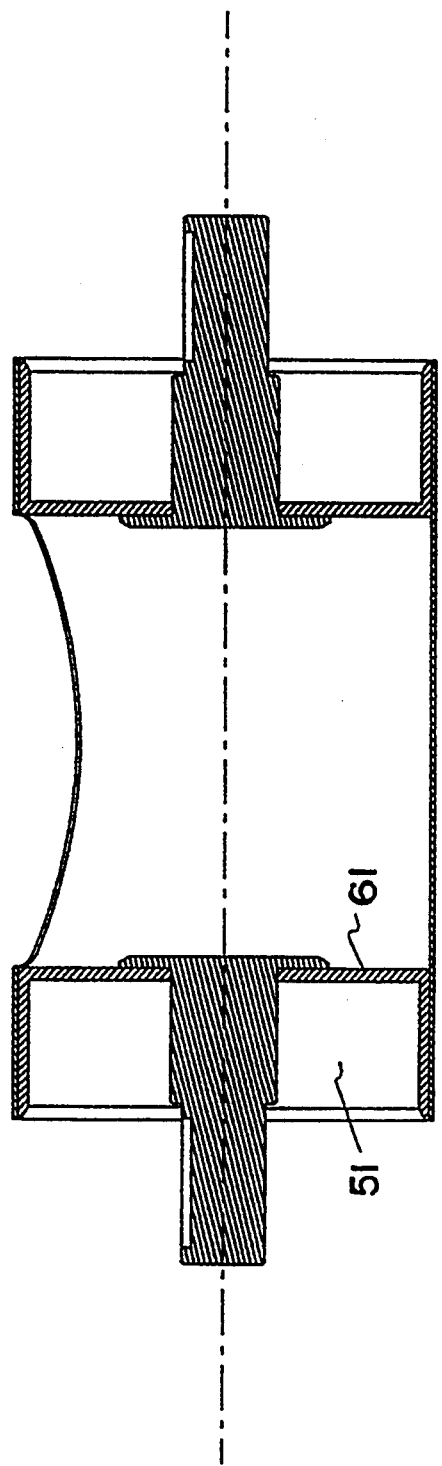
FIG. 7 is a cross section view of one embodiment of the rotor.
Figure 8:
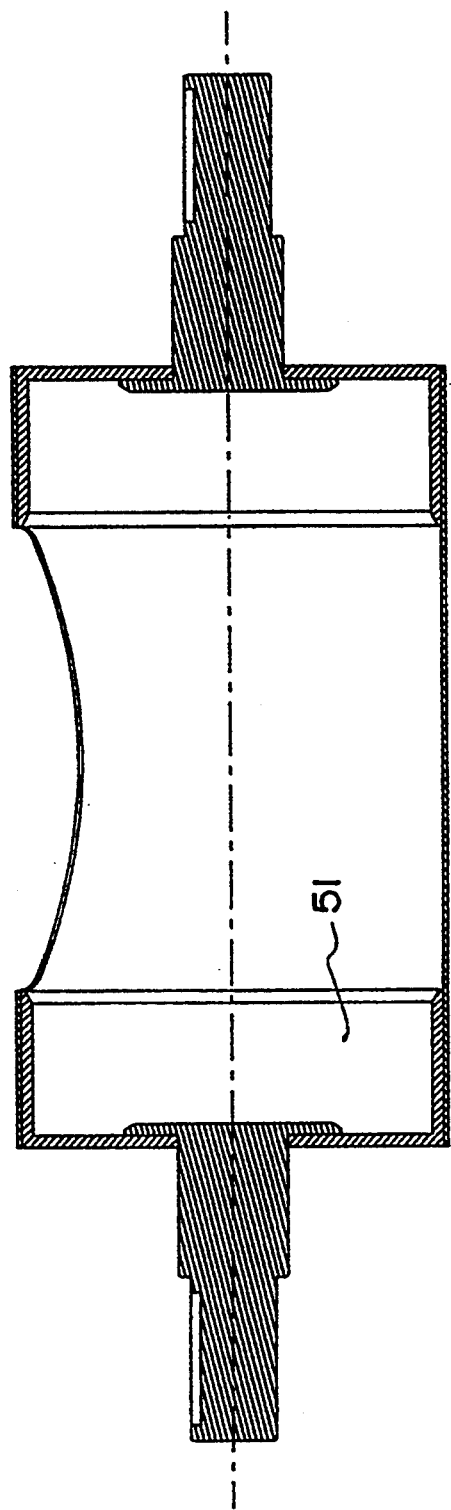
FIG. 8 is a cross section view of a second embodiment of the rotor.

For a better understanding of the features of the preferred embodiment, the preferred embodiment is illustrated in end view with the end plate removed in FIG. 6. Alternate embodiments of the rotor are also illustrated in FIGS. 7 and 8.

Figure 9:
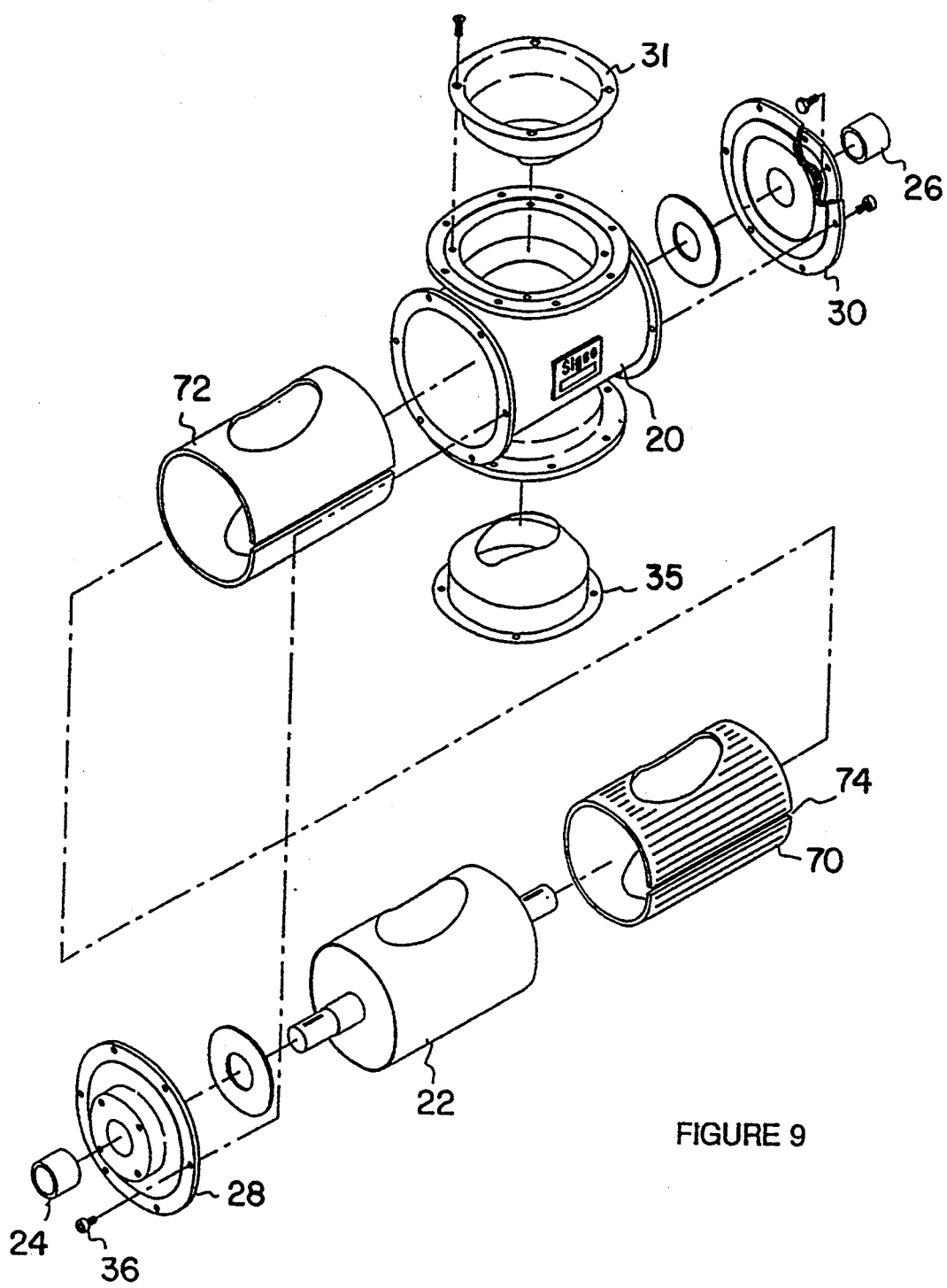
FIG. 9 is an exploded view of a second embodiment of the invention.

A first alternate embodiment of the invention is illustrated in FIG. 9. In order to emphasize the similarity to this embodiment with the first and the preferred embodiment illustrated in FIG. 1, the same reference numbers have been used to identify parts common to both embodiments.

The second embodiment of the invention illustrated in FIG. 9, differs from the embodiment illustrated in FIG. 1, in that this embodiment utilizes a different seat 70 and a different compression seal 72. Additionally, a second seat retainer 35 extends upward into a second opening in the seat 70 on the discharge side of the valve.

This embodiment has the characteristic that it removes ledges between the rotor 22 and the housing 20 at the output port of the valve. These ledges result from the longitudinal gap in the seat which extends outward beyond the inner surface of the housing. While these ledges may not form entrapment zones, as the term was previously defined, they do provide spaces in which material may accumulate. Additional cleaning techniques may be required to remove such accumulation of the material being transferred.

Figure 12:
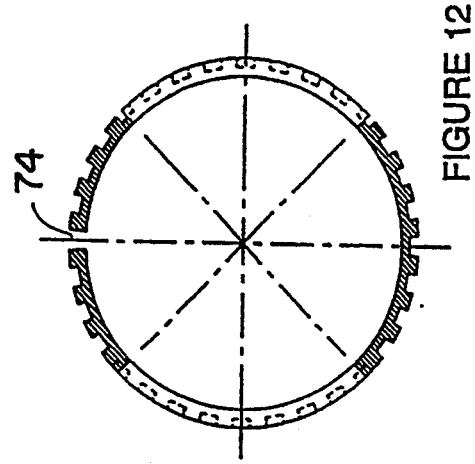
FIGS. 10, 11, and 12, are respectively the top, cross section and end views of a second seat.
Figure 10:
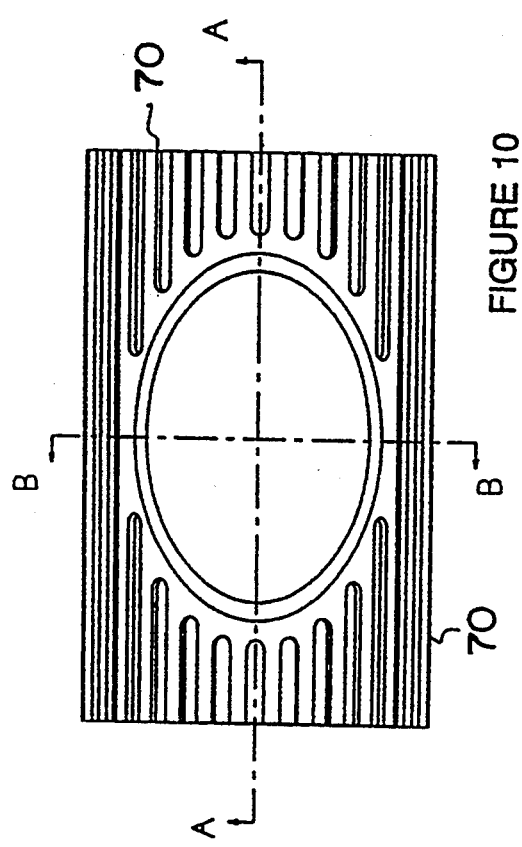
Figure 11:
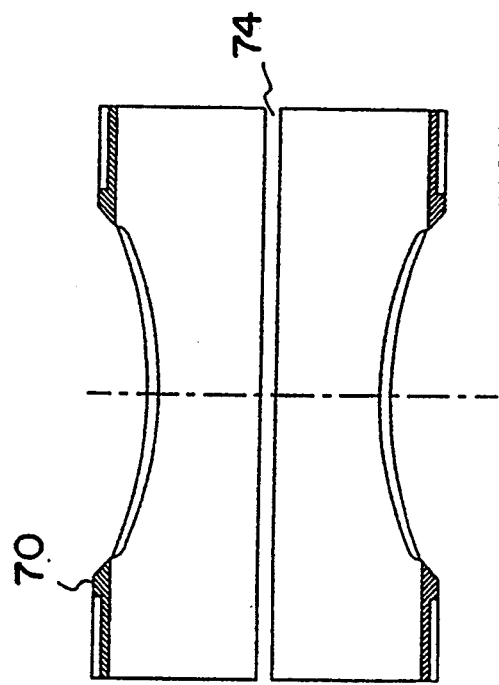

FIGS. 10, 11, and 12, respectively illustrate the seat 70 in top, cross section and end view. Identical top and bottom openings are provided for mating with the input and output seat retainers, 31 and 35. As with the first embodiment of the invention previously discussed, the compression seal 76 applies a force to the outer surface of the seat 70 to maintain the seat 70 in sealing contact with the outer surface of the rotor 22.

In operation, it is contemplated the rotor 22 will be driven in a forward-reverse cycle to sequentially position the rotor 22 in the fill and the discharge positions. When so driven the gap 74 will never be exposed to the interior of the rotor 22, preventing portions of the material being transferred from accumulating in the gap. Additionally, the seat 70 always provides a pressure seal isolating all interior portions of the valve from the cavity in the rotor 22. In this manner the shelves previously discussed with reference to FIG. 1 are eliminated in that the longitudinal gap 74 in the seat 70 is not normally exposed to the cavity of the rotor 22.

Figures 13, 13A:
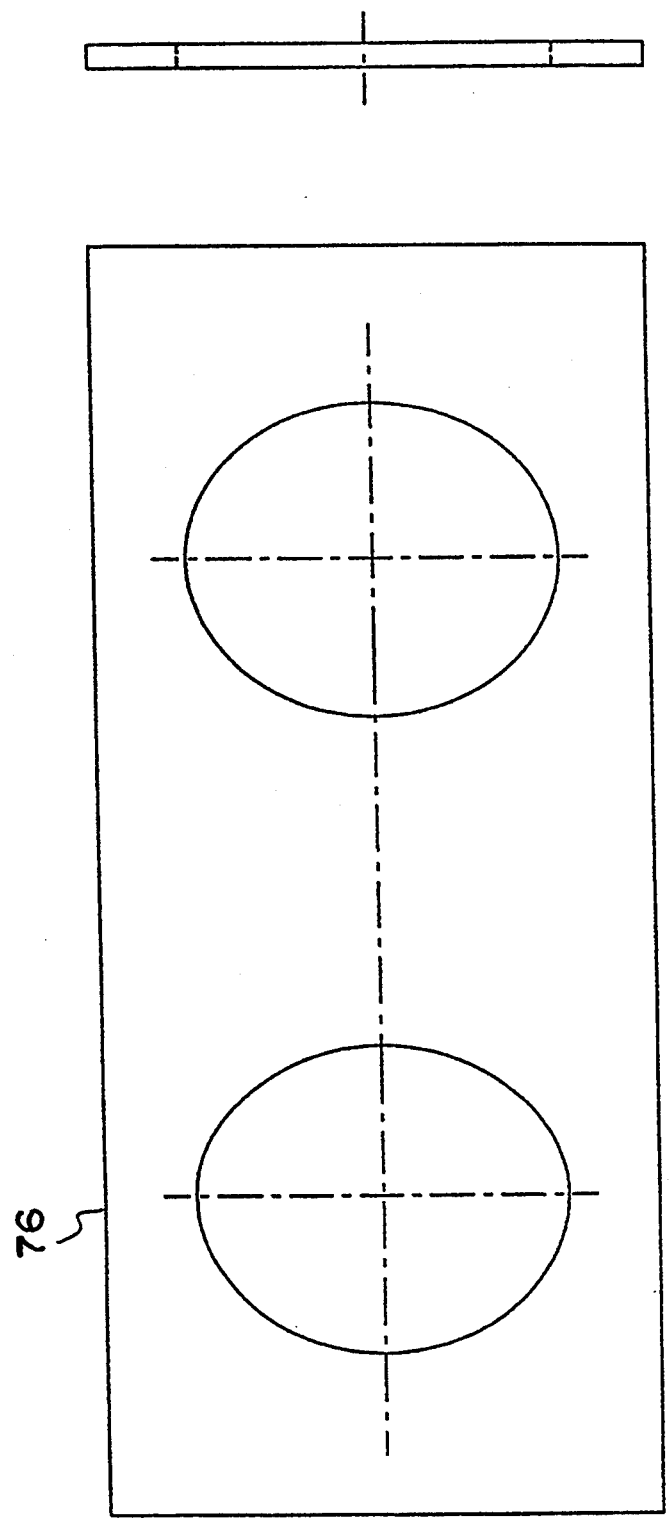
FIG. 13 is a plan view of a second embodiment of the compression seal.

The compression seal 76 may be made of silicone sponge. This compression seal is illustrated in plan view in FIG. 13.

Figure 14:
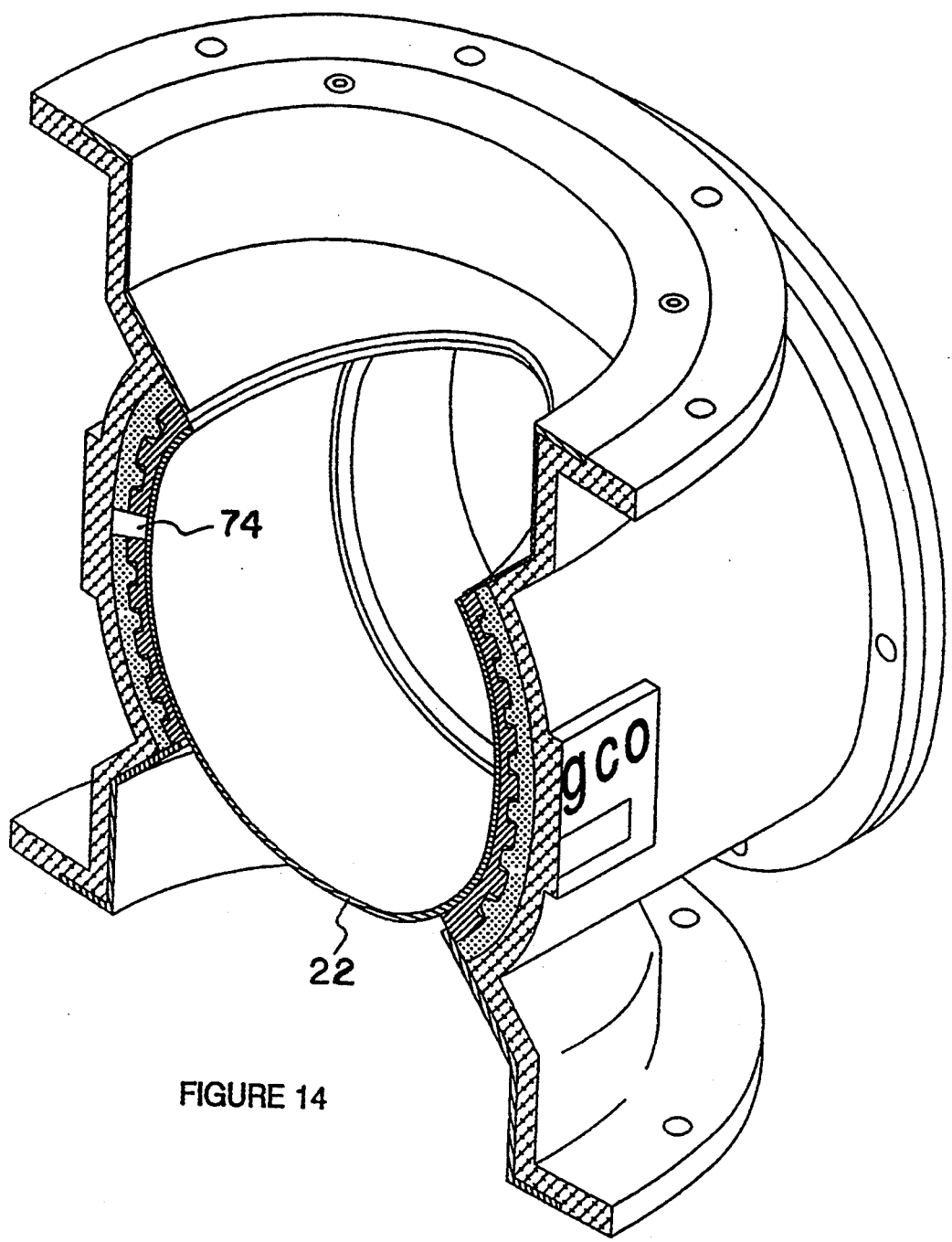
FIG. 14 is a cross section of the second embodiment of the invention with the rotor in the fill position.

The second embodiment of the invention is further illustrated in FIG. 14. In this Figure the rotor 22 is illustrated in the fill position. In the fill position material to be transferred flows into the cavity of the rotor 22. Drive means, not illustrated, drives the rotor to the discharge position with the material flowing downward under the force of gravity through the discharge port. Rotation of the rotor is reversed to return the rotor 22 to the fill position without exposing the gap 74 to the interior of the rotor 22, as previously discussed.

The seats, 38 and 70, contain common features which will now be collectively described. Serrations in the outer surface of the seat prevent the force applied to the outer surface of the seat by the compression seal from significantly deflecting portions of the seat into the opening in the rotor. Additionally, the preferred material for the seat is a plastic. Such materials have a high coefficient of thermal expansion. Provisions are provided by the longitudinal gap in the seat to prevent thermal expansion from deforming the seat, such that the seat lifts from the surface of the rotor. This gap in the seat also permits the seat to flex to compensate for rotor wear, seat wear or a combination thereof. The flutes in the outer surface of the seat permits the flexibility of the seat to be greater in a radial direction than it is in a longitudinal direction. Thus, the seat can be held in a sealing relationship with the rotor by the compression seal without significant inward deformation over the opening in the rotor.

Alternate embodiments of the rotor have also been shown. These embodiments differ in that the trunnions have been reversed. Reversing the trunnions eliminates ledges interior to the rotor that may undesirably accumulate material, in some applications.

Specifically, in FIG. 7, the interior cavity 51 of the trunnion 61 faces outward to provide an end wall adjacent the opening in the rotor. This improves drainage from the rotor. By contrast, the rotor illustrated in FIG. 8, the cavity of the trunnion 61 faces inward. This increases the capacity of the rotor with a slight decrease in drainage efficiency.

Figure 15:
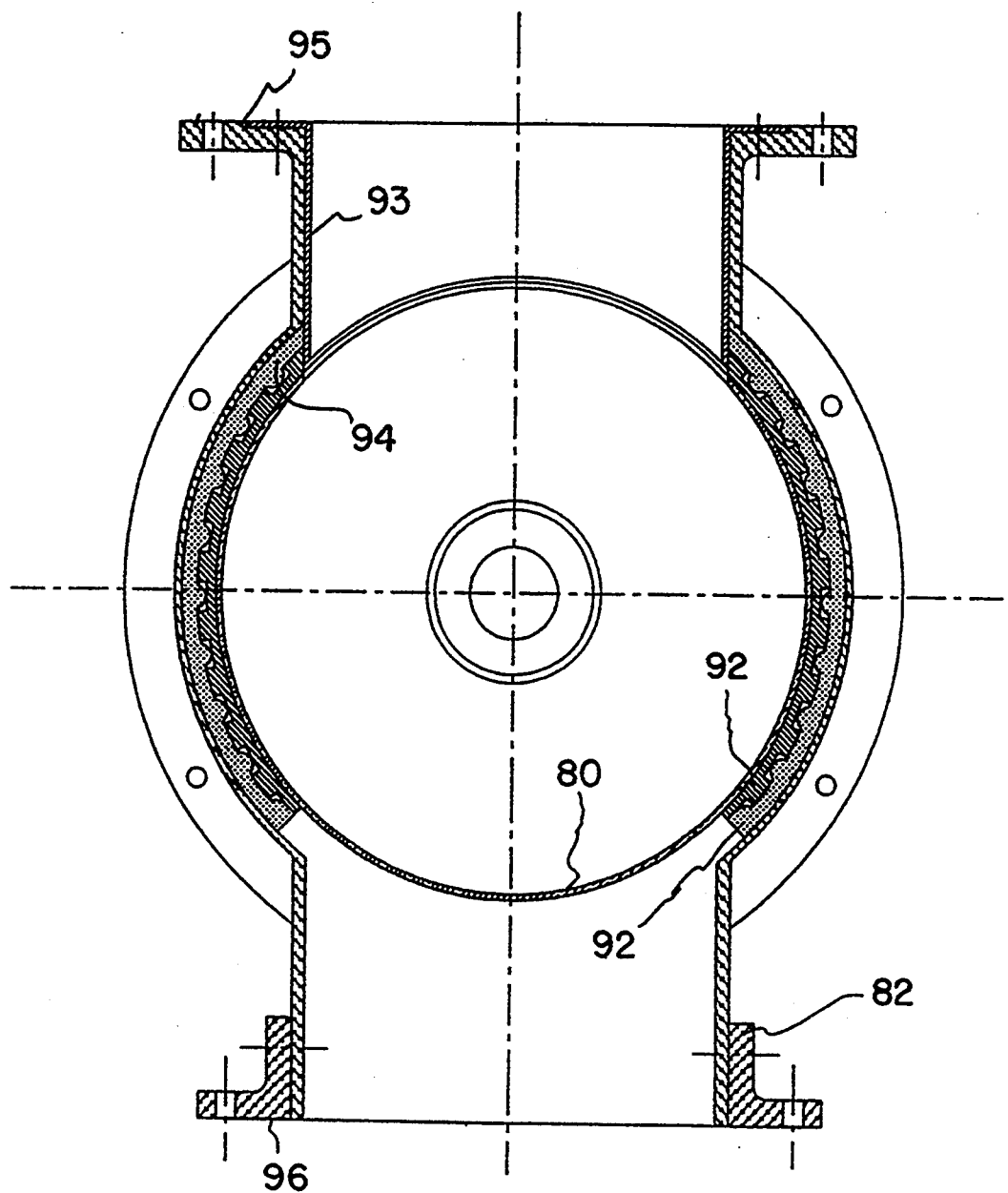
FIG. 15 is a cross section view of a third embodiment of the invention in a plane transverse to the axis of the rotor.
Figure 16:
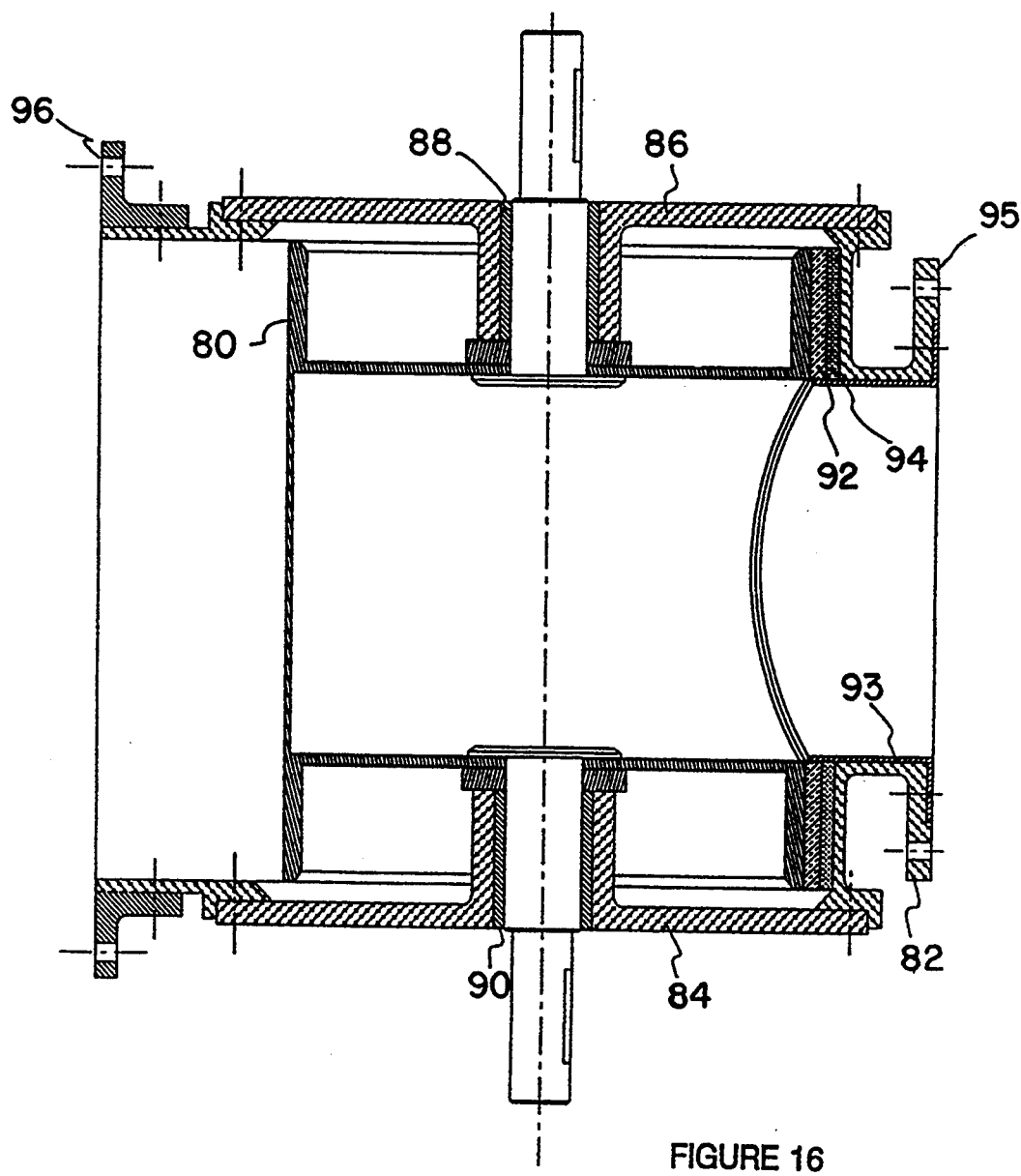
FIG. 16 is a cross section view of the third embodiment of the invention in the plane parallel to the axis of the rotor.

A third embodiment of the invention that can be easily fabricated from sheet materials is illustrated in cross section in FIGS. 15 and 16. Functionally, this embodiment contains all of the basic components discussed with respect to at least one of the prior embodiments. However, many of the components have been modified permitting them to be easily fabricated from sheet materials. These modifications also remove all of the ledges which could be present between portions of the rotor and the housing in some of the previous embodiments.

As in the previous embodiments, a rotor 80 having an opening in its outer surface is supported in a housing 82 by end plates, 84 and 86, and bearings, 88 and 90, to rotate about its axis. A seat 92 is positioned in sealing contact with the outer surface of the rotor 80. An inward directed pressure is applied to the outer surface of the seat 92 to maintain the seat 92 in sealing contact with the rotor 80. A seal retainer 93 that mates with the input flange 95, is secured to the housing 82 by screws, extends through the compression seal 94 and a predetermined distance into the seat 92 such that a small clearance is maintained between the end of the seat retainer 93 and the surface of the rotor 80. The salient feature of third embodiment that permits the valve to be "free draining" is the use of rectangular output port. These features are discussed in more detail below.

In operation, the material to be transferred through the valve enters the input port which terminates in the input flange 95, the rotor 80 is rotated through ninety degrees and the material is discharged by the force of gravity via an output port which terminates in an output flange 96.

Figure 17:
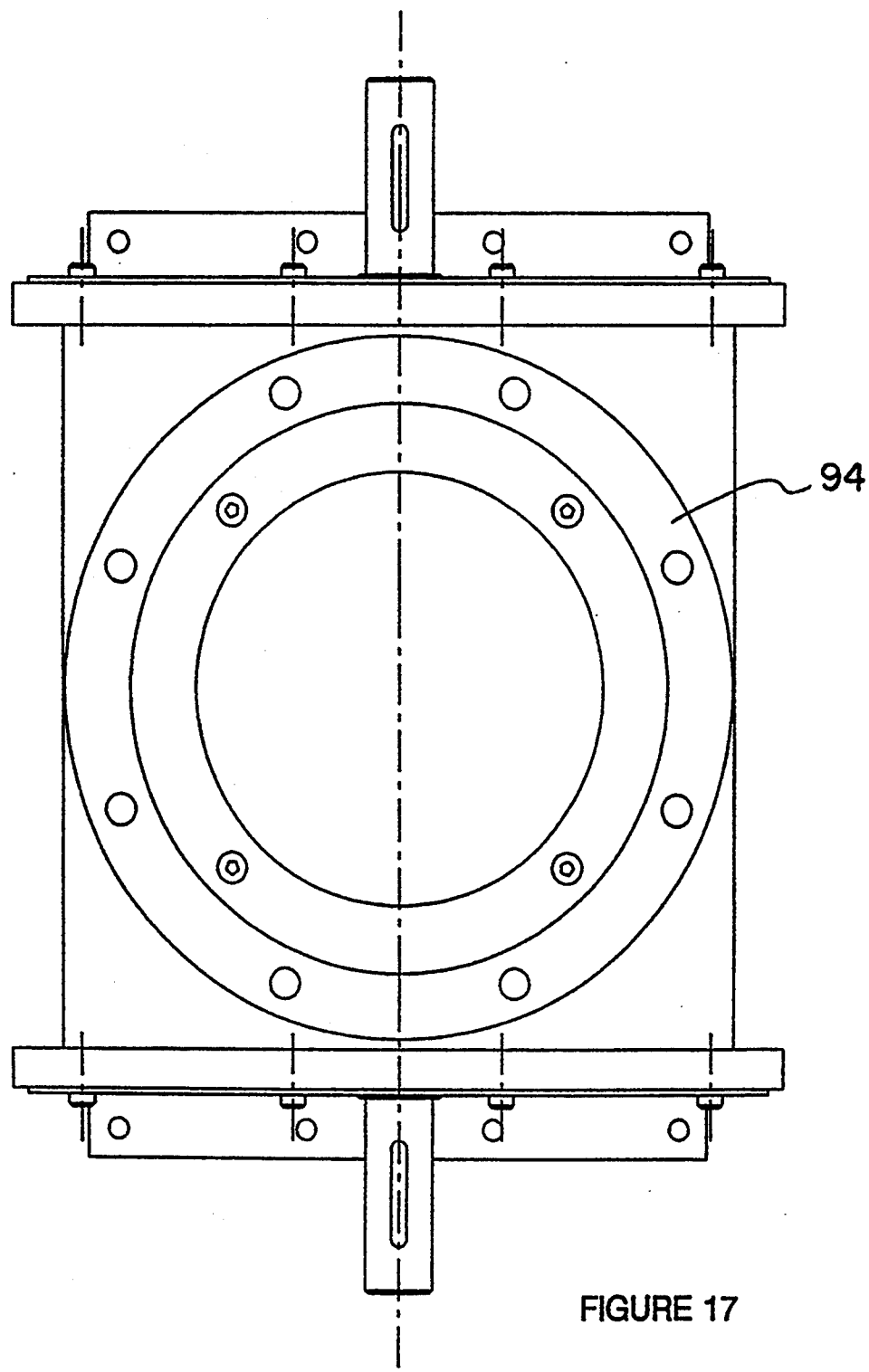
FIG. 17 is a top view of the third embodiment of the invention.
Figure 18:
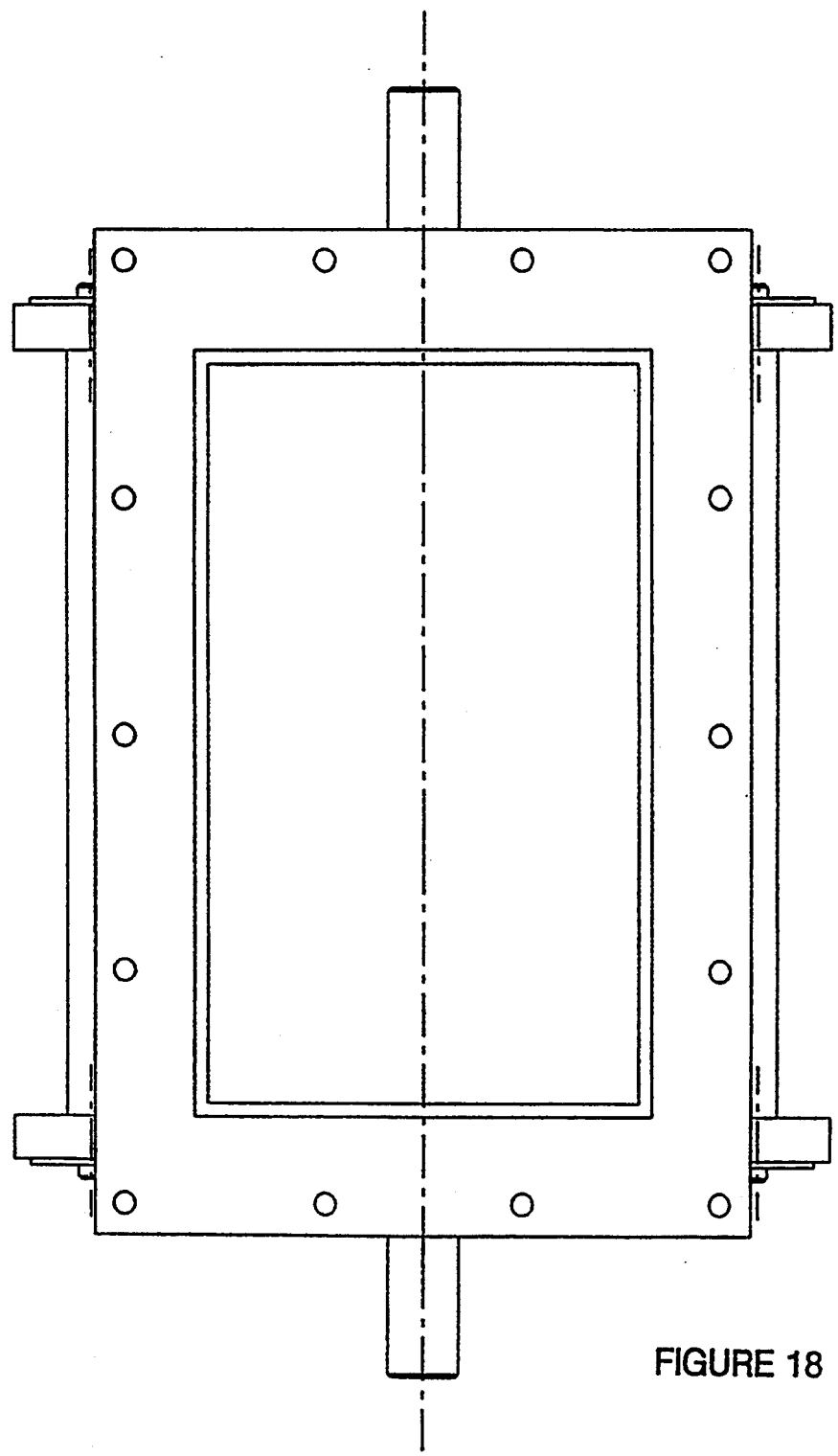
FIG. 18 is the bottom view of the third embodiment of the invention.

In this embodiment the input flange 94 is round, as illustrated in FIG. 17. As previously discussed, the output flange 96 is rectangular, as illustrated in FIG. 18. The rectangular output flange permits the inner walls of the housing to be aligned with the gap in the seat 92. This construction eliminates all of the ledges associated with other embodiments of the invention. Stated another way, all spaces interior to the housing 84 are open to freely drain under the force of gravity, through the discharge port.

Figure 19:
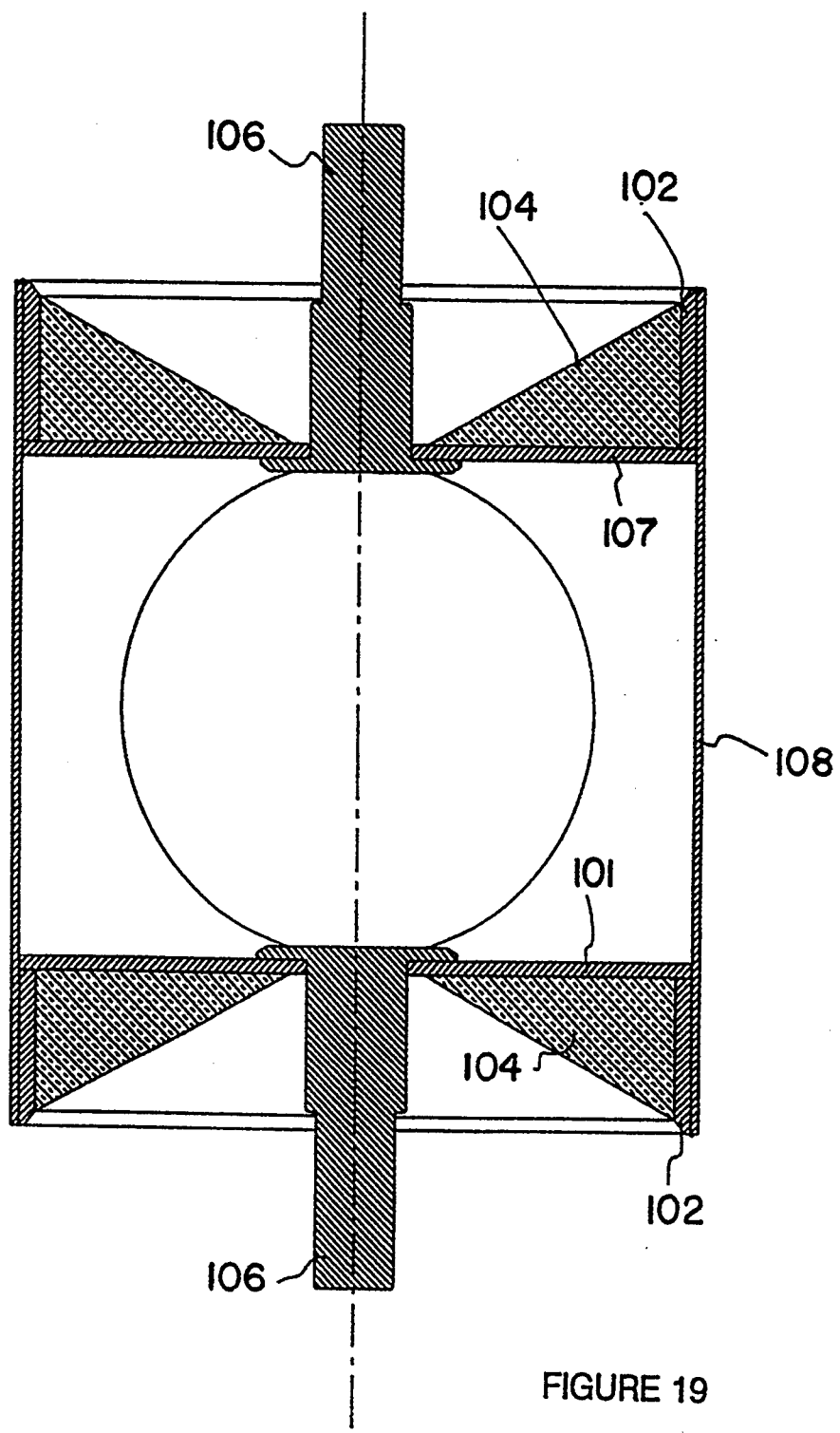
FIG. 19 is a cross section view of a first embodiment of the rotor used in the third embodiment of the invention.
Figure 20:
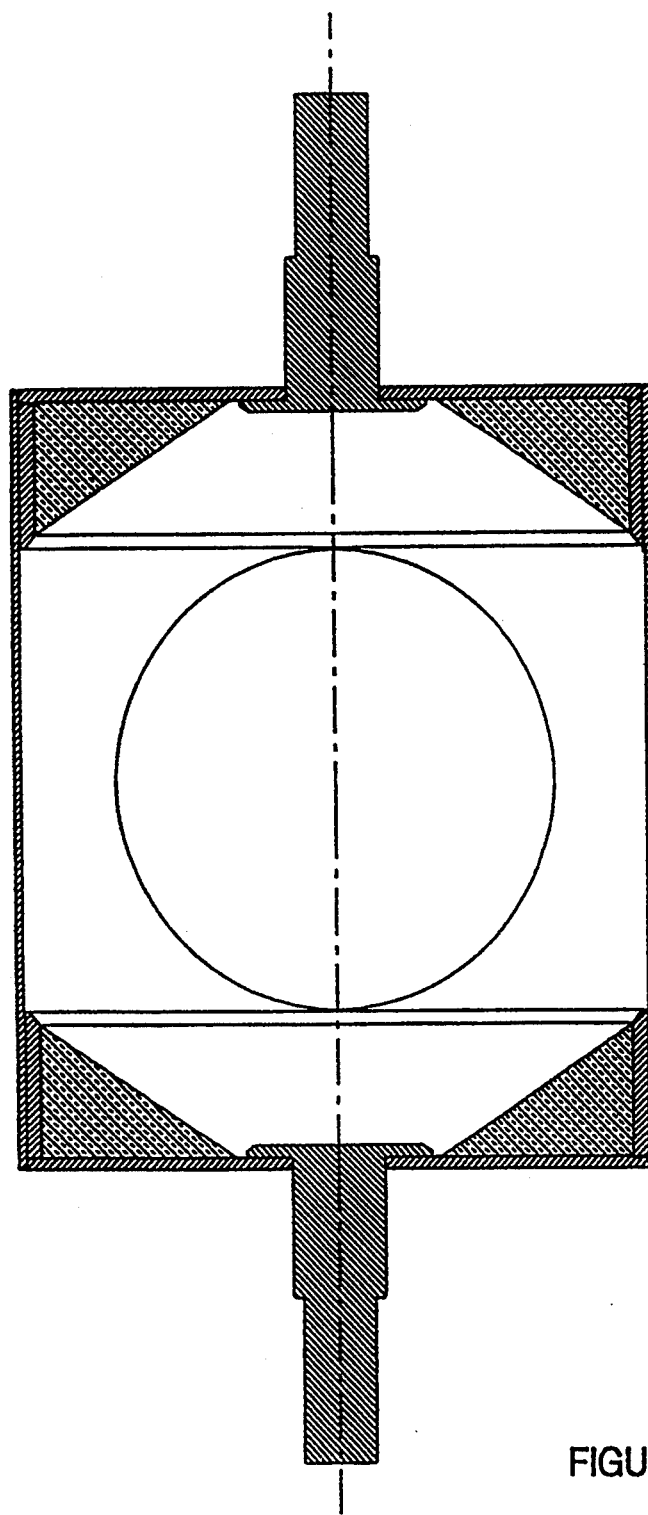
FIG. 20 is a cross section view of a second embodiment of the rotor used in the third embodiment of the invention.

Alternate embodiments of the rotor are illustrated in FIGS. 19 and 20. In each of these embodiments the rotor comprised of two trunnions, a cylinder and two trunnion filler portions. Both of these features are discussed in more detail below.

Each of the trunnions is comprised of a disc 101, a ring 102, a shaft 106 and a filler portion 104. More specifically, the disc 101 may be formed of sheet metal, such as stainless steel, by cutting the outer diameter with a conventional laser cutter. Similarly, the hole may be formed by laser cutting followed by reaming. The ring 102 may be formed either from tubing or from rolled sheet metal with the ends joined by welding. The disc 101 may be joined to the ring 102 by welding with the outer surface of the trunnion machined to the desired diameter.

The shaft 106 is formed from suitable bar stock by conventional machining. The shaft 106 can be conveniently attached to the disc 101 by welding after the shaft 106 has been inserted into the disc with an interference fit. Conventional welding techniques may be used to weld the shaft 106 to the disc 101 along the outer diameter of the shaft 106.

A trunnion filler portion 104 is positioned inside the ring portion 102 and adjacent the disc 101 to prevent a ledge from being formed in an area where the ring 102 joins the disc 101. Such a ledge could accumulate portions of the material being transferred through the valve.

The cylinder 108 has two trunnions positioned in the ends thereof.

The cylinder 108 may be formed of tubing or rolled sheet material. In either case the cylinder 108 may be attached to the trunnion by plug welding the cylinder 108 to the outer surface of the ring 102.

Rotor embodiments illustrated in FIGS. 19 and 20 differ in that the trunnions are reversed. Each of these embodiments has advantages, depending on the material to be transferred. For example, the embodiment illustrated in FIG. 19 may have better draining characteristics in that the edge of the trunnion form a straight wall coincident with the edge of the opening in the rotor. By contrast, the embodiment illustrated in FIG. 10 has more volume. This permits more material to be transferred with each revolution of the rotor.

Figure 23:
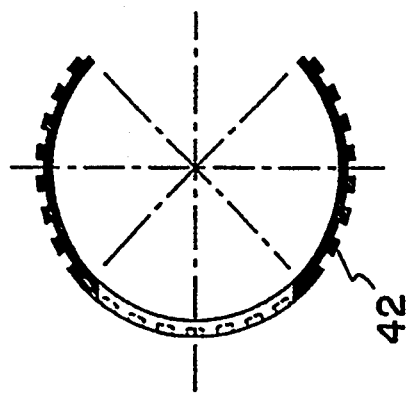
FIGS. 21, 22, and 23, are respectively top, cross section and end views of the seat used in the third embodiment of the invention.
Figure 21:
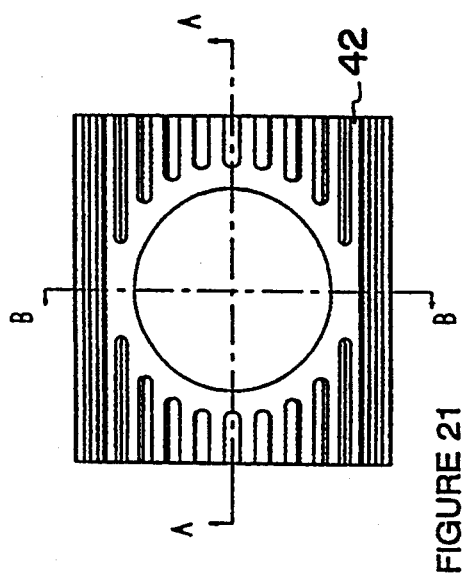
Figure 22:
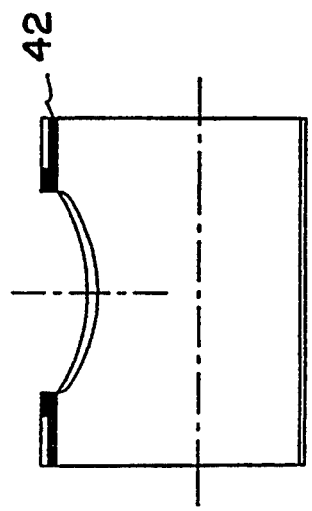

FIGS. 21, 22 and 23 respectively illustrate the top, cross section and the end view of the seat 42. From the top view it is clear the seat includes a circular opening permitting the seat retainer 92 to have a cylindrical cross section. Flutes extend longitudinally across the surface of the seat 42. These flutes function in a manner that was previously described with respect to the other embodiments.

Other salient features of the seat 93 are illustrated in FIGS. 22 and 23. This gap spacing serves in the same manner previously describe with reference to the first embodiment.

Figure 24A:
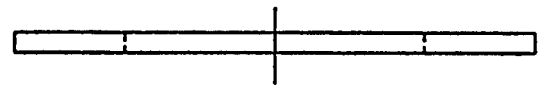
FIG. 24 is a plan view of the compression seal used in the third embodiment of the invention.
Figure 24:
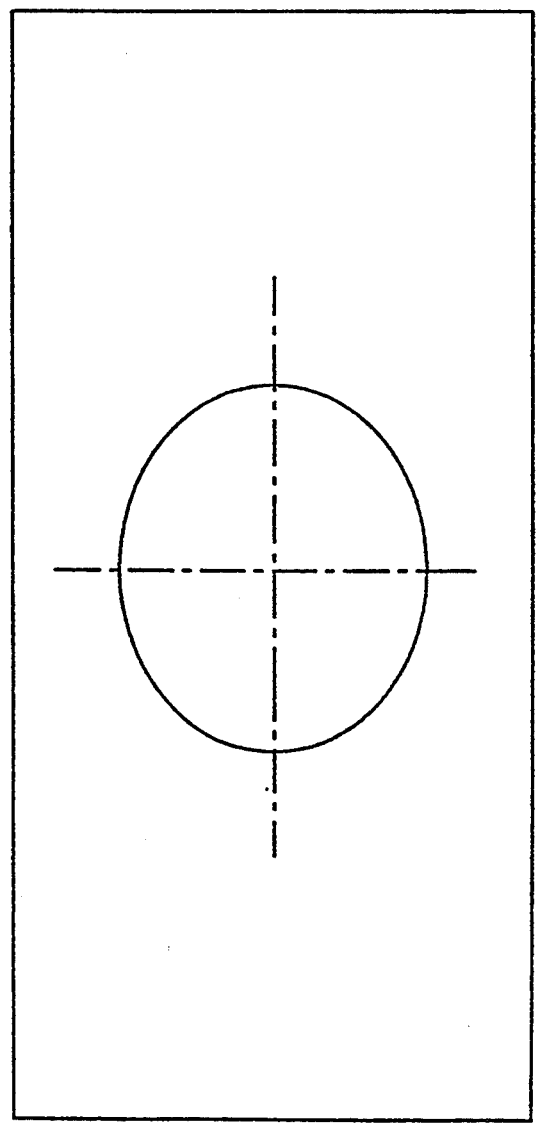

The compression seal 92 for use with this embodiment of the invention is illustrated in FIG. 24. This compression seal can be made of silicon foam and is similar to the compression seals previously described. The principle difference between this and the previously described compression seals is that the dimensions have been adjusted to conform the changed dimensions of the rotor and the seat.

I claim:

1. A vaneless rotor airlock valve comprising in combination:
   a) a housing including first and second intersecting bores, opposite ends of said first bore comprising input and output ports;
   b) a rotor including an outer surface having an opening therein to form a cavity in said rotor;
   c) bearing means for supporting said rotor in said second bore;
   d) a split cylindrical sealing structure positioned between said outer surface of said rotor and the inner surface of said second bore; and
   e) means for applying pressure to the outer surface of said sealing structure to maintain a pressure seal between the outer surface of said rotor and the inner surface of said sealing means to maintain pressure isolation between said input and said output ports.

2. A vaneless rotor airlock valve according to claim 1 wherein said split cylindrical sealing structure has an outer surface provided with a plurality of spaced serrations on said outer surface.

3. A vaneless rotor airlock valve according to claim 1, wherein said split cylindrical sealing structure is made of plastic having a high coefficient of thermal expansion.

4. A vaneless rotor airlock valve according to claim 3, wherein said split cylindrical sealing structure further includes a first opening in its outer surface, said first opening sharing a common axis of symmetry with said first bore.

5. A vaneless rotor airlock valve according to claim 4, wherein said split cylindrical sealing structure further includes a second opening in its outer surface, said second opening sharing a common axis of symmetry with said first opening and said first bore.

6. A vaneless rotor airlock valve according to claim 1, wherein said pressure means is a cylindrical compression seal which includes a top opening, said top opening sharing a common axis of symmetry with said first bore.

7. A vaneless rotor airlock valve according to claim 6, wherein said pressure means includes a bottom opening, said bottom opening sharing a common axis of symmetry with said first bore and said top opening.

8. A vaneless rotor airlock valve according to claim 6, wherein said compression seal is silicon sponge.

9. A vaneless rotor airlock valve according to claim 1, wherein said opposite ends of said first bore each terminate in a flange.

10. A vaneless rotor airlock valve according to claim 6, further comprising an end plate fastened to each end of said second bore.

11. A vaneless rotor airlock valve according to claim 1, wherein said input port further includes a input seat retainer positioned therein.

12. A vaneless rotor airlock valve according to claim 11 wherein said split cylindrical sealing structure further includes a curved member including a first opening therein for mating with said input seat retainer to direct material from said input port to said cavity within said rotor.

13. A vaneless rotor airlock valve according to claim 1, wherein said output port further includes an output seat retainer positioned therein.

14. A vaneless rotor airlock valve according to claim 13, wherein said split cylindrical sealing structure further includes a second opening therein for mating with said output seat retainer to direct material from said cavity to the output port upon the rotation of said rotor.

* * * * *